SATURATED STEAM TO HEAT EXCHANGER

SUPERHEATED STEAM FROM COMPRESSOR

CONDENSATE

Nov. 25, 1952           R. ANDERSEN           2,619,453

VAPOR-COMPRESSION DISTILLATION

Filed Dec. 13, 1950           8 Sheets-Sheet 6

Fig. 7.

INVENTOR:
Rolf Andersen,
BY

Fig. 9.

Patented Nov. 25, 1952

2,619,453

UNITED STATES PATENT OFFICE 2,619,453

VAPOR-COMPRESSION DISTILLATION

Rolf Andersen, Copenhagen, Denmark

Application December 13, 1950, Serial No. 200,522
In Denmark April 24, 1946

16 Claims. (Cl. 202—75)

This invention relates to the evaporation and distilling of fluids. This is a continuation-in-part of my applications Ser. No. 738,418, filed March 31, 1947, which became abandoned at the close of December 14, 1950, and Ser. No. 760,109 filed July 10, 1947, which became abandoned at the close of August 5, 1951.

More specifically, the invention relates to evaporation of more or less viscous fluids for the purpose of removing the liquid phase in order to produce a concentrate of the contents of solid material.

The invention also comprises distilling of water by removing water vapors from more or less hard water and condensing the vapors in form of distilled water.

The main object of the invention is to provide a plant for evaporation of fluids, which may be operated with greater economy than any previous plant. It will be clearly set forth that a plant for evaporating a certain fluid and having a certain capacity corresponding to the predetermined normal output per hour will be able to be operated by less energy consumption if designed in accordance with my invention than if designed in the conventional way.

Seen from another aspect, it is the object of my invention to provide a plant for evaporating fluids by means of which an increased output can be obtained, and it will be evident that a plant adapted for a certain capacity and having a predetermined output per time unit will have an increased output for the same energy consumption when designed according to my invention as compared with a plant designed in the conventional manner.

A more specific object of my invention is to provide a plant for evaporating liquids in which the liquid to be evaporated is forcibly circulated through one part of a heat exchanger, in the other part of which the vapors are condensed after having been subjected to a compression, and in which the energy for the compression can be reduced to such an extent that the sum of the energy necessary for the compression as well as the circulation will be less than in any previously known plant.

Still a further object of my invention is to provide a plant for producing distilled water in which the raw water is forced to circulate through one part of a heat exchanger, in the other part of which the water vapors are condensed after having been subjected to a compression, and by means of which the distilled water can be produced at a lower cost than in any previously known plant.

Still a further object of my invention is to provide a plant for producing distilled water in the manner here indicated which can be continuously operated with hard raw water without any risk that the formation of scale will occur in the interior of that part of the heat exchanger through which the raw water is circulated.

Still a further object of my invention is to provide a method for evaporating liquids by which a predetermined output can be obtained at lower costs than by any method known before.

More specifically, it is the object of my invention to provide a method for evaporating liquids having a viscosity, which at the evaporation temperature does not exceed 200 times the viscosity of water at about 20 centigrades, or about 2 poise.

Still a further object of my invention is to provide a method for distilling water, in which the water can continuously be distilled from hard raw water at a lower cost per unit of weight of distilled water produced than by any method known before.

With these and other objects in mind, which will appear from the following description, my invention consists of a combination of features, and steps, which will now be more fully explained in connection with the drawing and defined in the appended claims.

In the drawing:

Figure 4 is a graph that shows curves giving the energy consumption of the compressor and the circulation pump, respectively, as well as the total energy consumption as a function of the recirculation ratio in the system shown in Figure 1;

Figure 1:
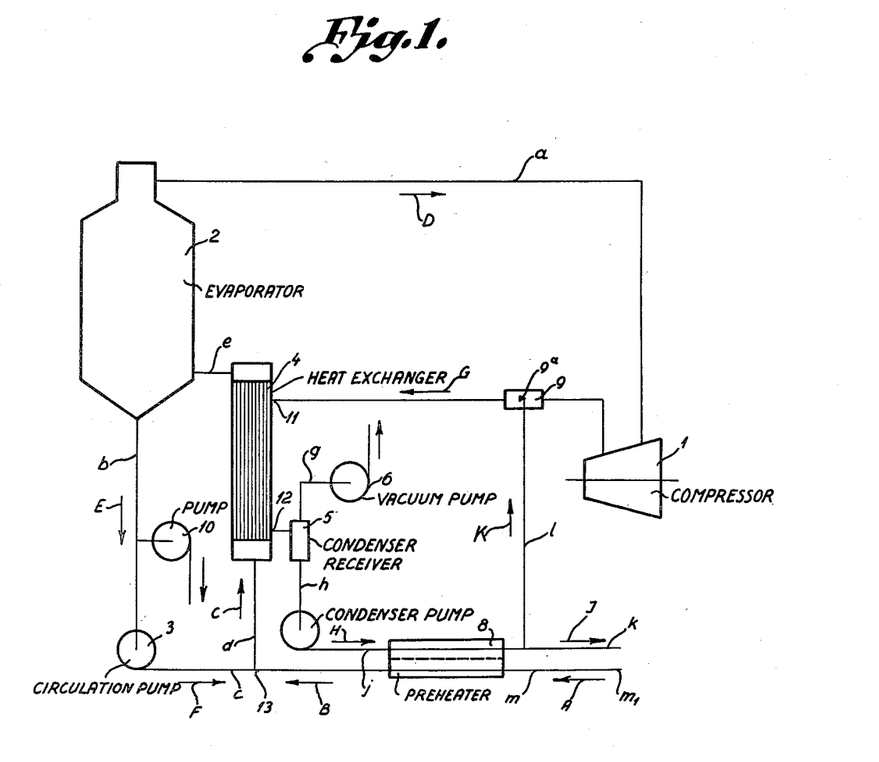
Figure 1 is a diagrammatic illustration of a plant according to the invention.

In the diagrammatic illustration shown in Figure 1, 1 is a compressor, preferably of the type having a small compression ratio such as a turbo compressor or the like; 2 is an evaporator, the top end of which is connected through a conduit $a$ with the suction side of the compressor 1. The bottom of the evaporator is through a conduit $b$ connected with a circulation pump 3, the other side of which is connected with the bottom of the heat exchanger 4 through conduits $c$, $d$. Preferably the heat exchanger is of the vertical multi-tube type, comprising a fluid circulation portion through the interior of the tubes and a vapor condensation portion on the exterior side of the tubes. The top of fluid circulation portion of the heat exchanger is through a further conduit $e$ connected with the lower portion of the evaporator. It will be understood that the system consisting of the bottom part of the evaporator, the conduit $b$, the circulation pump 3, the conduits $c$ and $d$ and the fluid portion of the heat exchanger 4 together with the conduit $e$ form a closed circulation system, through which the fluid can be forced to circulate by means of a circulation pump 3.

The other part of the heat exchanger 4 is through a conduit $f$ connected with the delivery side of the compressor 1. In the conduit $f$ there is inserted a cooler 9, the construction of which is shown in detail in Fig. 5. The cooler is operated on the principle that vapors from the compressor are cooled to the saturation temperature, but not condensed. The vapors are introduced in the condensation portion of the heat exchanger at 11 and removed at the bottom at 12 after having been condensed in the heat exchanger and having delivered the heat to the fluid circulated in the other part of the heat exchanger.

5 is a condenser receiver which if necessary is combined with an air separator. The condenser receiver is through a conduit $g$ connected to a vacuum pump 6. The condensed fluid is removed through a conduit $h$ by a condenser pump 7, from which a conduit $j$ passes through a preheater 8. On the other side of the preheater 8 the conduit $j$ branches into a conduit $k$, through which the condensate is removed and another conduit $l$, through which a part of the condensate is introduced in the cooler 9, in which it is passed through a nozzle $9a$ sprayed into the vapors coming from the compressor. A further conduit $m$ is at $m_1$ connected with the supply for fresh fluid to be evaporated and also passes through the preheater 8 extending into the circulation system through the evaporator at 13.

The concentrated fluid, which may be formed in the evaporator may for instance be continuously removed from the circulation system through the evaporator by means of a pump 10.

Figure 2:
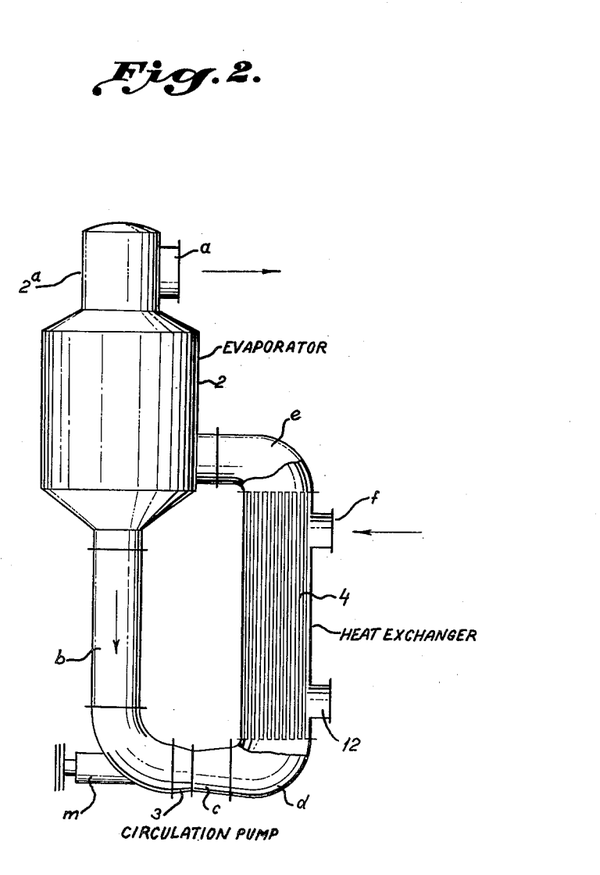
Figure 2 is a side view partly in section of the fluid circulating system of the plant illustrated in Fig. 1.

A schematic view of the circulation system through the evaporator and the heat exchanger is shown in Fig. 2. Here it is more clearly shown that the heat exchanger is of the vertical multi-tube type. The top outlet of the one part of the heat exchanger 4 is through the relatively wide conduit $e$ connected with the lower part of the evaporator 2, which consists of a container of suitable type having a top bulb $2a$, from which the conduit $a$ is branched to the compressor. The bottom part of the heat exchanger is through the relatively wide conduit $d$ connected directly with the conduit $c$, in which the circulation pump 3 is directly inserted. This pump may be of any convenient type adapted to allow passage of fluid and designed to circulate the fluid through the heat exchanger. The construction of the pump is shown in greater detail in Fig. 3. The pump is so arranged that the pressure side is connected to the conduit $c$. The suction side is through the conduit $b$ connected with the bottom of the evaporator 2. In Fig. 2 also the fluid supply pipe $m$ is shown.

Figure 7:
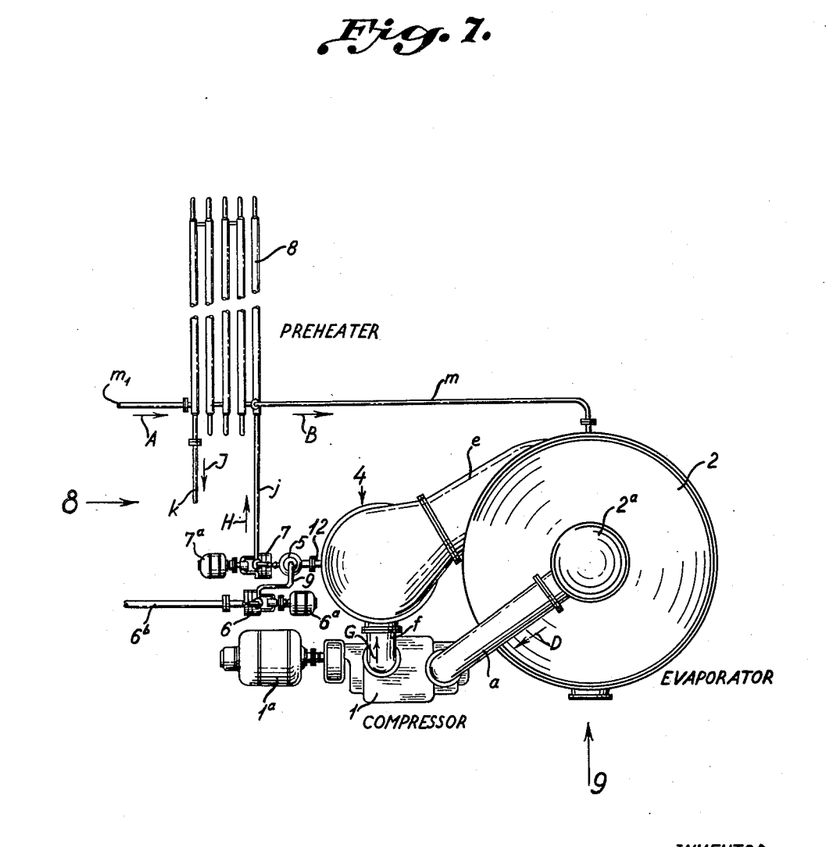
Figure 7 is a plan view of a practical embodiment of a plant of the type shown schematically in Figure 1.
Figure 8:
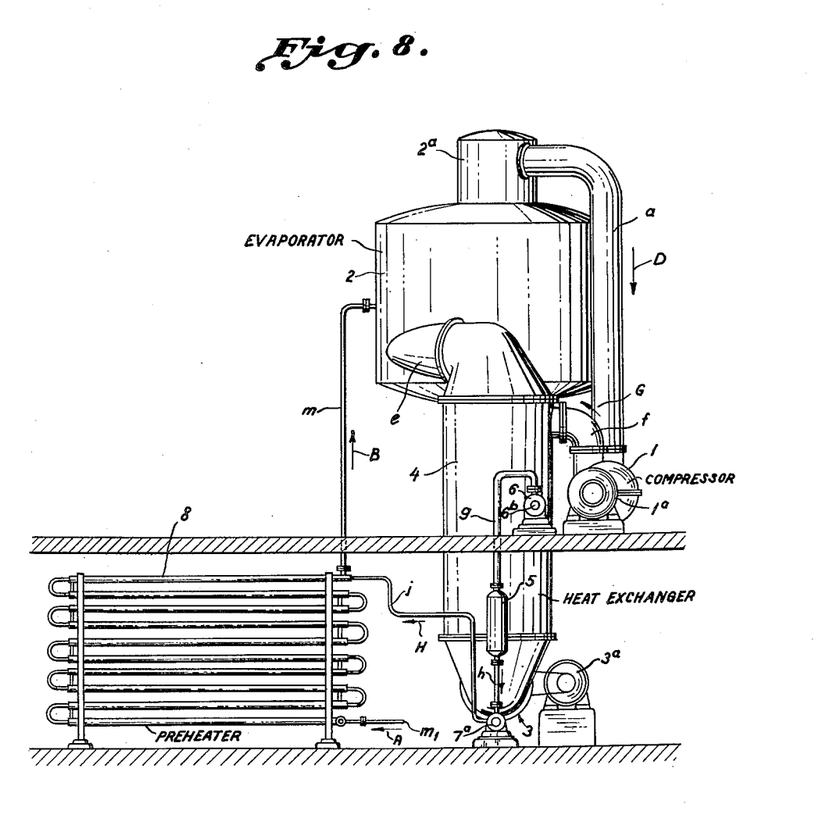
Figure 8 is an elevational view of the plant shown in Figure 7 seen in direction of the arrow 8 of Figure 7.
Figure 9:
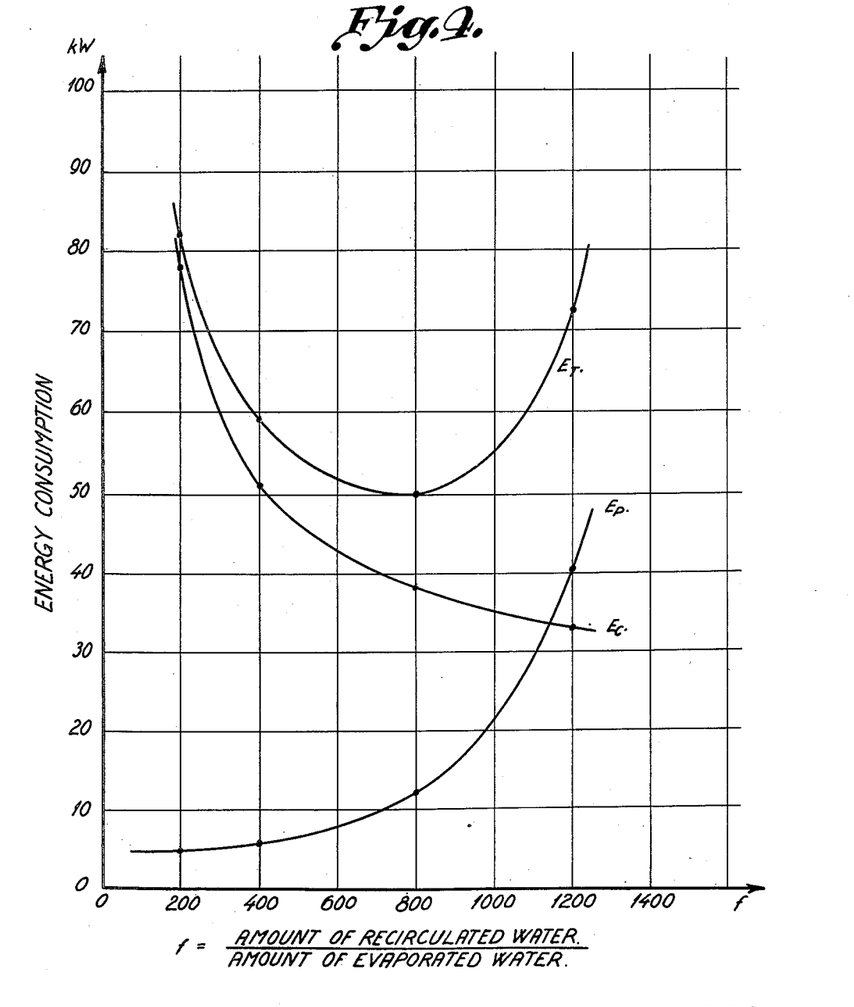
Figure 9 is an elevational view of the plant shown in Figure 7 seen in direction of the arrow 9 of Figure 7.

In the operation of the plant here described the fluid is circulated in the following manner. The fluid to be evaporated is supplied through the pipe $m$ in direction of the arrow A (Figs. 7, 8, and 9). The fluid passes the preheater 8 where it is heated to a temperature approximately equal to that at which the evaporator 2 is operated. From the preheater the fluid is further supplied in direction of the arrow B and arrives at 13 in the circulation system, where it passes through the conduit $d$ in direction of the arrow C to the bottom of the heat exchanger 4. From here the fluid passes through the circulation part of the heat exchanger and leaves it at the top end, from where it passes through the conduit $e$ to the evaporator 2.

In the evaporator a part of the fluid is evaporated leaving the evaporator in the form of vapors passing through the conduit $a$ in direction of the arrow D to the suction side of the compressor 1. The non-evaporated part of the fluid is, by means of the circulation pump 3, forced to circulate through the heat exchanger and the evaporator in direction of the arrows E and F as well as through the branch $d$ in direction of the arrow C. When the plant has been operated for some time, the fluid circulating in this part of the system will, provided it is a fluid with a content of solid particles, be a more or less concentrated fluid, into which the supply fluid is immediately mixed at the supply point 13. It will be understood that the supply point 13, namely the point where the conduit $m$ branches into the circulating system is not limited to the embodiment shown so that the supply point can be anywhere else in this part of the circulating system.

The vapors passing through the conduit $a$ to the compressor are here compressed and thereby superheated to some extent. From the delivery side of the compressor the superheated vapors are passed through the conduit $f$, where they pass the cooler 9. As previously mentioned, the cooler is designed to cool the superheated vapors to a temperature near the saturation temperature without condensing the vapors. The cooled, superheated, but not condensed vapors are then passed through the conduit $f$ in direction of the arrow G entering in the outer part of the heat exchanger at 11. In the heat exchanger the vapors are condensed on the exterior side of the tubes through which the circulating fluid is passing and thereby delivering the condensing heat to the circulating fluid inside the tubes.

By means of the vacuum pump 6, which is connected with the lower end of this part of the heat exchanger at 12 the non-condensable gases and the non-condensed vapors are removed. The condensate, however, passes through the condenser receiver and air separator 5, in which the air is separated and leaves the plant through the vacuum pump 6, while the condensate by means of the condenser pump 7 is drawn through the conduits $h$ and $j$ in direction of the arrow H. The condensate then passes the preheater and is partly removed from the conduit $k$ in direction of the arrow J, partly supplied to the cooler through the conduit $l$ in direction of the arrow K. In the cooler the condensate is sprayed through the nozzle 9a into the vapors passing through the cooler, thereby contributing to cooling the vapors to the saturation temperature.

Figure 3:
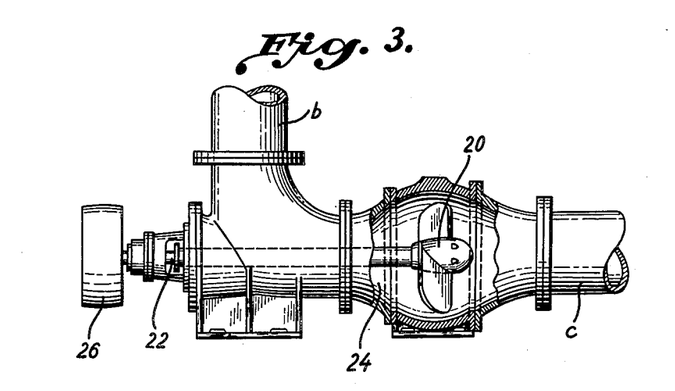
Figure 3 is a side view of the circulation pump, partly in section.

A very important feature of the system here described is the arrangement and operation of the circulation pump 3. In the recirculation system shown in Fig. 2, which is drawn to a scale of about 1:50, it will be seen that the pump 3 is of relatively large dimensions. As shown in Fig. 3 the pump may be of the so-called mixed-flow type or another convenient type having a high effect, comprising a rotor 20 mounted on a spindle 22. The rotor is arranged in a housing 24, which forms the link between the return pipe $b$ from the evaporator and the supply pipe $e$ to the heat exchanger. The spindle 22 extends through one end of the housing and carries here a pulley 26, from which the pump is driven by means of a motor (not shown). As it will be seen, the rotor of the pump is arranged directly in the conduit. This type of pump is generally known in other types of circulation systems and those skilled in the art will from the following description, be able to select the special pump necessary for the present plant so that a more detailed description of the pump should not be necessary.

It should further be noted that all conduits in the circulation system are made as short as possible and as wide as possible to provide the smallest possible resistance to the circulation of the fluid.

The reason for this arrangement is that the circulation pump in accordance with an important feature of the invention must be dimensioned so as to transport through the recirculation system comprising the circulation portion of the heat exchanger and the evaporator, per time unit, a fluid body the weight of which is between 300 and 1500 times the weight of the vapors evaporated from said fluid body during the same time unit.

This will of course require a relatively large energy consumption for the circulation pump, but in spite thereof I have found that the total energy consumption of the plant when designed for a certain capacity will be less than in the event that the circulation pump was dimensioned for circulating a fluid body of the amount heretofore used. The reason why this recirculation factor is so important with respect to the total economy of the plant will now be more fully explained with reference to a practical example.

*Example 1*

In order to simplify the description of the operation and the more essential features of the invention this example will deal with evaporation of water in general, without specific reference, however, to such features which are important in connection with production of distilled water.

The plant to be specified here is of the general type described with reference to Figs. 1 and 2.

In order to illustrate the advantages of the invention we will now assume that the plant is designed for a definite output of 3600 kg. per hour and having a heat exchanger with an approximate area of 150 m.² consisting of 640 copper tubes of a size 2.5 m. long of circular cross section with an interior diameter of 28 mm. and an exterior diameter of 32 mm.

(a) Assuming that the circulation pump is stopped and the plant is driven by natural circulation, it can then be calculated that the energy consumption of the plant will be approximately 100 kw., which means that the motor for the compressor will consume about 100 kw. In other words the total consumption to produce the output of 3600 kg. in one hour will be 100 kw.

It can also be calculated that the necessary temperature difference in the heat exchanger, namely the difference between that portion of the heat exchanger, in which the water is circulating and that portion in which the vapors are condensed will be about 10 centigrades.

It should not be necessary here in detail to explain, how the energy consumption and necessary temperature difference can be calculated. Those skilled in the art will be able to make these calculations from the informatoin given in various text books, see for instance V. H. McAdams: "Heat Transmission," 2nd edition, McGraw Hill Book Company, New York, 1942, see especially Table IX, page 326, and the text.

It will be understood that by driving the specific plant indicated in this example so as to deliver the specific output of 3600 kg. per hour the output will be 36 kg. of water per kwh.

For the sake of good order it should be added here that it may be possible to design a plant for evaporating water with the same output in which the energy consumption may be less than the figures given here of 100 kw., or the temperature difference in the heat exchanger will be less than the 10 centigrades calculated. In such event, however, it will be necessary to increase the area of the heat exchanger. It is therefore important in comparing the conditions in the following, to keep in mind that we are comparing the operating conditions in a plant, in which the heat exchanger surface area is predetermined, because without this presupposition it is not possible to make exact comparisons.

(b) Let us now assume we start the circulation pump and allow it to circulate a fluid body of 200 times the vapors evaporated from the fluid body per same time unit.

We can then calculate that the temperature difference in the heat exchanger will be 7.5 centigrades, the energy consumption of the compressor will be 79 kw. and the energy consumption of the circulation pump will be 5 kw. This gives a total energy consumption of 84 kw. corresponding to an output of 43 kg. water per kwh. Also this part of the calculation can be made by those skilled in the art on the basis of the teaching given in McAdams, see chapters 7 and 9.

(c) Let us now assume that we increase the circulation from 200 to 400 times the amount of vapors evaporated from the fluid body per time unit.

It will be easily understood that this will increase the energy consumption of the circulation pump and our calculations will show that it will decrease the temperature difference and the energy consumption of the compressor.

In this case calculation will reveal that the energy consumption of the circulation pump is 6 kw., the temperature difference in the heat exchanger is 5 centigrades and the energy consumption of the compressor is 53 kw. This gives a total energy consumption of 53 plus 6 equal to 59 kw. This corresponds to an output of 61 kg. water per kwh.

(d) Let us now further increase the circulation to 800 times the vapors evaporated from the fluid body per time unit. This will further increase the energy consumption of the circulation pump. Our calculations will show an energy consumption of 12 kw. for this pump. The remaining part of the calculations will show a temperature difference in the heat exchanger of 4 centigrades and an energy consumption for the compressor of 38 kw. The total energy consumption will be 38 plus 12 equal to 50 kw. This corresponds to an output of 72 kg. water per kwh.

(e) Let us further increase the circulation to 1200 times the vapors evaporated from the fluid body per time unit. This will increase the energy consumption of the circulation pump to 40 kw., decrease the temperature difference to 3.5 centigrades and decrease the energy consumption of the compressor to 35 kw. Here, however, the total energy consumption of the plant is 33 plus 40 equal to 73 kw. This corresponds to an output of 49 kg. water per kwh.

By carrying out these calculations for other amounts of circulation it will be possible to draw curves for the energy consumption of the compressor as well as for that of the pump as a function of the recirculation ratio, namely the ratio between the amount of recirculated water and the amount of evaporated water per time unit. These curves will correspond to those shown in Fig. 4 of the drawing. Here the curve $E_c$ is the energy consumption of the compressor as a function of the recirculation ratio, and the curve $E_p$ is the energy consumption of the circulation pump as a function of the recirculation ratio.

As under b, c, d and e in the examples the total energy consumption has been calculated, it is also possible to draw a curve showing the total energy consumption as a function of the recirculation ratio. This curve is that designated $E_t$ in Fig. 4. It will be noted that this curve has a minimum corresponding to a recirculation ratio of about 800.

From this example it will be understood that an important feature of my invention is to operate the circulation pump so as to circulate a fluid body far beyond what heretofore has been considered reasonable. It is surprising that in spite of the fact that this increased circulation increases the energy consumption of the pump it enables the total energy consumption of the plant to be decreased, provided the circulation is kept within certain limits.

In practice, the advantageous effect of my invention, providing for the decrease of total energy consumption, or expressed in another manner, the increased output per time unit of energy consumption will be obtained between circulation ratios of 300 and 1500.

The reason for the above described surprising experience briefly is that by increasing the recirculation factor, the velocity of the fluid through the heat exchanger tubes is increased. The increased velocity in its turn improves the heat transmission and thereby enables the temperature difference to be decreased. Furthermore, the decreased temperature difference enables the compressor energy consumption to be decreased.

It is, however, not the increase of velocity attained by the increase in circulation ratio, which by itself is responsible for the results achieved. Only in combination with the large weight of circulating fluid body the advantageous effect is really obtained. It will be understood that by means of the increased velocity the heat transmission conditions are improved so as to enable the heat exchanger to be operated with a small temperature difference. This means, however, that it will only be possible to increase the temperature of the amount of fluid passing through the heat exchanger by a few degrees. Therefore, if only a relatively small amount of fluid is recirculated even with a rather high velocity through the heater tubes, only a very limited amount of heat will be transferred with the result that the output of the plant will be relatively small. First by also increasing the amount of fluid recirculated, the amount of heat transferred will be sufficient to enable a large output.

If we have a temperature difference of, for instance, 4 centigrades in the heat exchanger between that portion in which the steam is condensed and that portion in which the fluid is recirculated, it will be understood that the maximum temperature rise of the fluid by passing from one end of the exchanger tubes to the other is 4 centigrades. This corresponds to a heat transfer to the recirculating fluid of 4 kcal. per kg. Since the heat of vaporization is 540 kcal. per kg. it will be understood that the supply of 4 kcal. per kg. will result in the evaporation of 4 divided by 540, equalling 0.0074 kg. evaporated water for each kg. recirculated water. It is however, not very convenient to allow the recirculating fluid to be heated by 4 centigrades available, because with an increase of 4 centigrades by passing the heater tubes the average increase of temperature will be 2 centigrades. This means that only one-half of the available temperature difference between the two portions of the heat exchanger is really utilized, which is inconvenient.

It would therefore be more convenient if for instance the recirculation fluid was only heated by 1 centigrade during the passage through the heater tubes, because that would utilize 3½ centigrades of the 4 centigrades available.

This means again, however, that we will have to increase the amount of fluid recirculated. If we do not do that, we will have only ¼ of the 0.0074 kg. evaporated per kg. recirculated.

Figure 6:
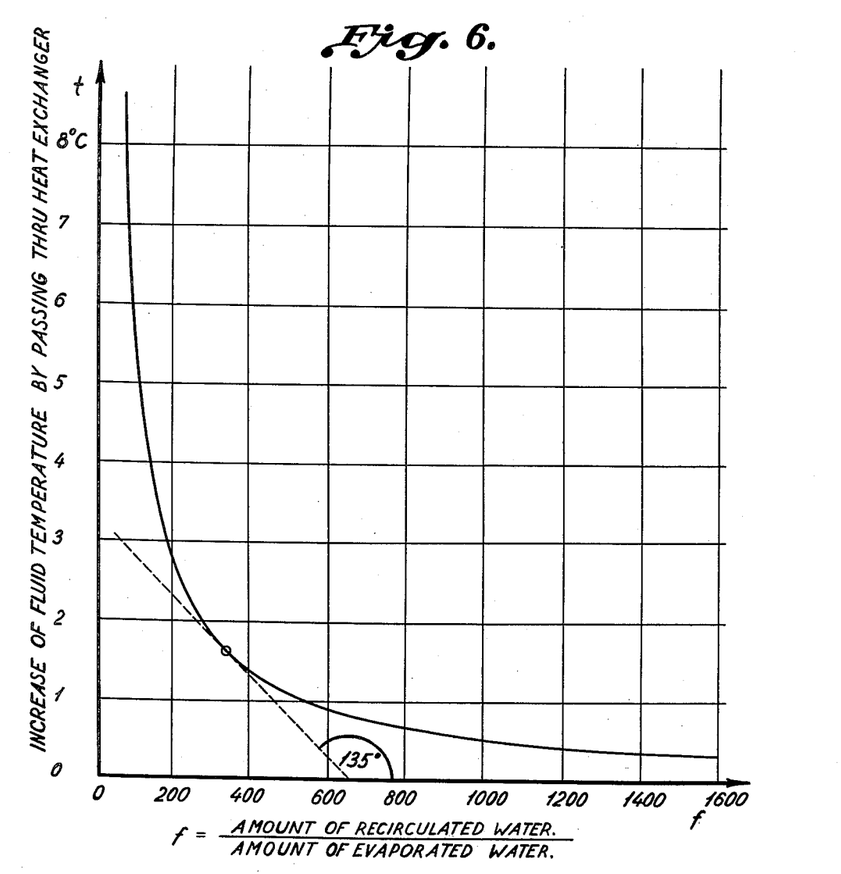
Figure 6 is a graph illustrating a curve showing the increase of fluid temperature by the passage of the heat exchanger as a function of the recirculation ratio.

Since for a predetermined amount of heat the increase of temperature by the passage of the heater tubes is in inverse proportion to the amount circulated, it is possible to plot a curve like that shown in Fig. 6, showing the increase of temperature by the passage in the heater tubes as a function of the recirculation factor.

From this curve of Fig. 6 it can directly be found how small the increase of temperature by the passage of the heater tubes can be made for the different recirculation ratios. For instance, at a recirculation ratio of 800 it will be sufficient to allow the recirculating fluid to be heated for about 0.7 centigrade by the passage in the heater tubes. With a temperature difference of 4 centigrades as under (d) in the Example 1 this will give a utilization of about 3.6 of the 4 centigrades available. This is 90 per cent utilization of the available temperature difference between the two portions of the heat exchanger.

It will be understood from this explanation that it is not only a question of obtaining a high velocity of the fluid in the heater tubes; the velocity is only selected by convenient choice of tube diameter so as to attain proper heat transmission conditions and thereby low compressor energy. A velocity of 1 to 3 meters per second will normally be found adequate. It is only by combining a velocity that enables a low temperature difference to be used between the two portions of the heat exchanger with a large recirculating ratio, that the surprising effect of my invention is really obtained. From the curve it will, however, be seen that I obtain an improvement averaging about 20 per cent, with respect to the economy of a similar plant of the same dimensions which is not operated and constructed in accordance with my invention. The maximum increase in economy is about 30 per cent.

As pointed out, all comparisons of the operation conditions must be made on the basis of a heat exchanger of a predetermined surface area. I have already mentioned that in the case of natural circulation an increase of heat exchanger area will enable the temperature difference to be decreased. If we started the same examples over again, however, with another heat exchanger area for instance of double the size, we would again find that by increasing the circulation ratio, the advantageous economic effect of my large circulation ratio would be obtained based on said larger heat exchanger.

In practice, however, the size of a heat exchanger is limited. Theoretically it is of course possible to make the heat exchanger indefinitely large and thereby running the plant with natural circulation and with very small energy consumption for the compressor. In practice, however, a heat exchanger of the size presupposed in the above named example must be regarded as normal. It will be understood that the heat exchanger itself is a part of the plant, and if made too large, the costs will rise and thereby the depreciation of the heat exchanger will be too large. Therefore, in practice, a heat exchanger of a moderate size should be selected in a plant as described, and in such a case the advantages of my large circulation ratio are always obtained.

The above named example merely illustrates the basic principle of my invention and explains how the advantages are obtained. It will be understood, however, that by evaporating other fluids than water the conditions will be slightly changed to obtain the optimal effect. For instance, the recirculation ratio should be between 800 and 900 instead of, as in the example, slightly below 800. The compression ratio should be between 1.1 and 1.9.

In the following a few examples will illustrate how plants should be designed in some special cases.

*Example 2*

Let us consider a plant for evaporating water from whey having a content of 60 per cent dry matter. This means that the whey circulating through the heat exchanger and the evaporator has a content of 60 per cent dry matter. The plant is as that shown schematically in Fig. 1. The heat exchanger consists of 547 tubes of stainless steel having a length of 3.2 meter and with a circular cross section having an interior diameter of 23 mm. and an exterior diameter of 25 mm. This corresponds to a heat exchanging area of approximately 132 m.$^2$.

The recirculation pump is of the axial flow type shown in Fig. 3 making approximately 600 R. P. M. The rate of flow is approximately 1200 m.$^3$ per hour.

In order to decrease the resistance in the circulation system the return pipe $b$ has a diameter of 600 mm. The evaporator is approximately 2 meters in diameter in height. The suction pipe $a$ from the top of the evaporator to the compressor is approximately 600 mm. in diameter and the pressure pipe $f$ from the compressor to the heat exchanger is approximately 400 mm. in diameter.

The compressor is of the centrifugal type, having 3 stages. Pressure at inlet side is 0.09770 kg. per cm.$^2$ (corresponding to a saturation temperature of 45 centigrades). The pressure at outlet side is 0.1605 kg. per cm.$^2$ (corresponding to a saturation temperature of 55 centigrades). The ratio of compression is 1.64.

The output from the evaporator, which is also the output of the compressor, is 1500 kg. per hour. As previously stated, the rate of the circulation pump is 1200 m.$^3$ per hour, thus giving a circulation ratio of 800. The energy consumption of the compressor including gear and motor is approximately 65 kw. The energy consumption of the circulation pump including the pump motor is approximately 10 kw. giving a total energy consumption of 75 kw.

Figure 5:
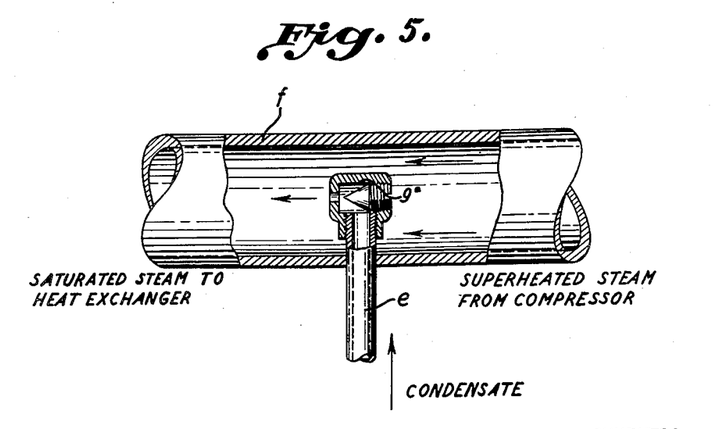
Figure 5 is a fragmentary sectional view, partly in elevation, showing a detail of the plant shown in Figure 1, showing an injector system.

As explained generally in connection with the description of Fig. 1, the superheated vapors from the compressor are cooled in the cooler 9 by spraying an amount of the condensate through the nozzle 9a. In practice the arrangement may be made as shown in Fig. 5. Here the pipe 1 having the spray nozzle 9a at the end, is simply introduced through the wall of the pipe $f$. The spray nozzle should be of the type capable of propelling the fluid in a rather atomized condition. The flow of condensate through the nozzle may be controlled by means of a hand operated valve 28. The supply should be adjusted so as to deliver an amount of condensate sufficient to cool the vapors to saturated condition. In the present example a supply of about 5 per cent condensate compared with that delivered from the compressor will be sufficient.

From this example it will be found that approximately 20 kg. water is evaporated per kwh. or, in other words, for evaporation of 1000 kg. water from whey having a content of 60 per cent dry matter approximately 50 kwh. are required, which is well below what has been obtained heretofore.

Through the supply pipe $m$ whey is continuously supplied in an amount equal to the sum of the amount evaporated and the amount continuously removed by means of the pump 10. For instance a continuous supply of 1650 kg. per hour will correspond to a continuous removing of 150 kg. per hour of concentrated whey. The raw whey supplied has a content of 6 per cent dry matter and the whey removed has as previously stated a content of 60 per cent dry matter.

*Example 3*

This example is for a plant for evaporating water from skimmed milk circulated through the heat exchanger, and with 30 per cent dry matter.

The plant is the same as schematically shown in Fig. 1. The heat exchanger consists of 900 tubes of stainless steel having a length of 4 m. and with circular cross section having an interior diameter of 27.5 mm. and an exterior diameter of 30 mm. This corresponds to a heat exchanging area of approximately 325 m.$^2$.

The circulation pump is of the type specified in Example 2 or may be of the mixed-flow type. The rate of flow is approximately 3850 m.$^3$ per hour. The dimensions of the pipes are about 1.5 times of those given in Example 2.

The compressor is of the type specified in Example 2. Pressure at inlet side is 0.09770 kg. per cm.³, corresponding to a saturation temperature of 45 centigrades. The pressure at outlet side is 0.13216 kg. per cm.² corresponding to a saturation temperature of 51 centigrades.

The output from the evaporator is 5000 kg. per hour. With a rate of flow of 3850 m.³ per hour, this gives a recirculation ratio of 770.

The energy consumption of the compressor including gear and motor is approximately 103 kw. The energy consumption of the recirculation pump with motor is 27 kw. This gives a total energy consumption of 130 kw.

This means that this plant will give approximately 30 kg. water evaporated per kwh., or, in other words, for the evaporation of 1000 kg. of water from skimmed milk with 30 per cent dry matter, approximately 26 kwh. is required.

As in the case of Example 2, a part of the condensate is supplied through the nozzle 9a.

The skimmed milk may be supplied with a content of dry matter at 6 per cent. As in Example 2, there is a continuous supply of raw milk corresponding to the amount evaporated plus the amount removed by means of the pump 10.

A more specific description of a practical embodiment of a plant according to my invention with reference to Figures 7 through 9 will now be given. In these figures the different parts already referred to in the diagrammatic illustration of Fig. 1 are designated by corresponding reference numerals. 1 is the compressor with motor 1a, which through the pipe line a is connected with the top 2a of the evaporator 2, and the outer side of which is connected with the upper end of the condenser portion of the heat exchanger through the pipe f.

The top of the heat exchanger 4 is through the pipe e connected with the evaporator 2 from the bottom of which the pipe b leads to the circulation pump 3, the motor of which is referred to as 3a.

The pressure side of the recirculation pump 3 is connected through the pipe c with the bottom of the heat exchanger 4; 5 is the condenser receiver, the one end of which is connected at 12 with the bottom side of the condenser portion of the heat exchanger, and the other side of which is connected through the pipe h with the condenser pump 7, the motor of which is designated 7a, and the outer side of which is connected with the preheater 8 through the pipe j. The raw fluid is supplied at $m_1$ and passes through the preheater following the arrow A entering at the bottom of the preheater 8 and leaving at the top, passing through the pipe m in direction of the arrow B. In contrast with the diagrammatic view of Fig. 1 the supply of raw fluid is here inserted in the evaporator, but it will be understood that in practice the raw water can be supplied anywhere in the recirculation system.

The condensate removed by the pump 7 is through the pipe j in direction of the arrow H supplied to the top of the preheater 8, leaving at the bottom through the pipe k in direction of the arrow J.

The preheater shown is of the so-called double-tube type and is here inserted so that the two directions of fluid flow are in opposite counterstream. From the top of the condenser receiver 5 the pipe 9 is connected to the vacuum pump 6, the motor of which is indicated at 6a (not shown in Fig. 9). The pressure side of the vacuum pump 6 is by means of a pipe 6b connected to the free air. The pump 10 (Fig. 1) is now shown in the detail drawings (Figs. 7, 8 and 9), but is connected through the pipe 12 at the bottom of the recirculating system. In this pipe a valve 13 may be inserted as shown.

In order to heat the plant initially there may be arranged a steam pipe 14 extending into the top of the condenser portion of the heat exchanger, through which steam may be supplied through a steam plant, if one is available. In such a case the return pipe k is connected with the outer end of the steam plant to remove the condensed water. When the plant is heated, a valve 14a is closed to interrupt the supply of steam.

In case of the plant being used for evaporating a non-aqueous fluid, the condensate leaving from the preheater through the pipe k may be simply removed as waste fluid. In the event the plant is used for producing distilled water, the condensate is the distilled water taken out.

If no steam plant is available to heat the plant there may for instance, as indicated in dotted lines, be inserted in the pipe line b an electric heating element 15, which is switched on until the fluid circulating in the heat exchanger has been heated to the normal operating temperature. Hereafter the electric heater may be switched off.

By insulating the different pipe lines, and, if necessary, the heat exchanger and the evaporator also, the losses can be kept so low that no further heat has to be supplied once the plant has been preheated to the operating temperature. It will be understood that the necessary insulation of the plant depends upon the operating temperature, so that more insulation is necessary in order to prevent losses from a plant for producing distilled water operating at a temperature of about 100 centigrades, than in the case of a plant for evaporating a fluid under vacuum with the evaporation taking place for instance at 45 centigrades. The dimensions of a plant as described here have already been given under Example 1. It will be understood that with the dimensions given the plant may as indicated be mounted with the preheater and circulation pump on the floor 18 of the basement, while the compressor is arranged on the floor 20 of the first floor of the building, where the plant is installed. Also the operation of the plant will be easily understood from the description of the operation given in connection with Fig. 1.

Returning now to the more specific problems in connection with the operation of the plant for the purpose of producing distilled water, in this case the raw water is supplied as feed water and the distilled water is taken out through the pipe k. The feed water will always have a certain content of scale forming solids, which will give rise to the formation of scale on the interior side of the tubes in the recirculation system. If such scale formation is allowed in the tubes of the heat exchanger it will reduce the heat transmission and thereby adversely influence the economy of the plant. To avoid this it is therefore of vital importance in a plant for producing distilled water that the water be treated for precipitation of impurities in the form of a slurry.

For this purpose there may be inserted, as shown, in the pipe line b or in any other convenient part of the recirculation system, an electrode 20 of a suitable material, such as pure iron or aluminum. This electrode may consist of one or more rods or otherwise formed electrodes, which at their lower ends at 21 are arranged through the pipe wall and insulated therefrom by a suitable electrical insulation (not shown). A suitable positive direct current voltage is applied to the electrode 20, the negative voltage being applied to the remaining part of the recirculation system at a terminal 22. Preferably the whole recirculating system should have the same potential, so care must be exercised to establish good electrical connection between the different pipes, for instance by electrically bridging packings or other insulating material, which might be inserted between flanges where the pipes are assembled. The voltage supplied should be so selected that the potential difference between the electrode 20 and the walls of the recirculation system is a few volts, for instance between 2 and 10 volts, which in practice has been found sufficient. The voltage difference applied will cause an electrolytical effect to take place with the walls of the water circulation system acting as a cathode. Electrolysis of the water will thereby cause the solid materials contained in the water together with the metal hydroxide, for instance aluminum hydroxide, formed by the electrolysis to form a loose slurry which cannot deposit itself as incrustations in the vertical tubes of the heat exchanger.

Since the velocity of the recirculating water is rather high and the viscosity of the water is small, there will be sufficient turbulence in the water to obtain a uniform distribution of the slurry in the recirculating water.

In order to remove the slurry, a part of the recirculating water can be drained off through the pipe 12. This draining off can be made continuous by adjusting the valve 13. For instance the water can be drained off at a rate of 5 per cent of the raw water supplied through the supply pipe.

In connection with this manner of preventing formation of scale on the interior side of the heat exchanger tubes, the large recirculation factor also assumes importance.

It has been found by experience that though electrolysis will cause the solid material contained in the water to form a loose slurry, the prevention of formation of incrustations is not obtained in cases where boiling takes place. It is supposed that the formation of steam bubbles provides an electrical insulation of the walls, where the steam is formed adjacent the walls, though the truth of this theory has not been proved. It is, however, an experience, that some sort of incrustations are formed on the walls, when boiling takes place.

By means of the large recirculation ratio, however, boiling is definitely prevented from taking place in a plant designed according to my invention. As specifically explained hereinbefore, especially with reference to Fig. 6, the large recirculation ratio enables a very small increase of temperature by the passage of the water through the heat exchanger tubes to be used. If for instance this increase of temperature is 1 centigrade, boiling will only be allowed to take place in the tubes provided that the hydrostatic pressure at the top end of the tubes is less than about 0.4 m. water column. In a plant of the kind described here there will, however, always be more than 0.4 water column above the top end of the tubes, because a water level at least of this height above the top of the tubes in the pipe e will be necessary to allow the large amount of water to stream from the tubes to the evaporator. On the other hand, the hydrostatic head above the top of the tubes should not be too large. A head of for instance from 0.2 to 0.8 meter will be sufficient.

It will be understood that the use of electrolysis for preventing formation of scale is not limited to a plant in which distilled water is produced. For instance, electrolysis may also be used with advantage in plants for evaporating other fluids having contents of scale forming solid materials.

It will be understood that the vacuum pump 6 determines the pressure on the condenser side of the heat exchanger and thereby also determines the temperature at which the evaporation takes place. This temperature will of course depend upon various circumstances and upon the fluid which is to be evaporated.

While in the examples given above, the compressor has been referred to as a compressor of the centrifugal or axial-flow type, it will be understood that a reciprocating type can also be used. It will be understood that in the case of small plants the compressor may simply be a blower such as a fan blower of a convenient type, or even a piston pump.

With respect to the use of the plant here described for evaporating more or less viscous fluids, it should be remarked that not all fluids can be evaporated in the plant with the advantages specified, thus for instance it will hardly be possible to evaporate molasses in connection with sugar production further than to the last step but one, because fluid having a viscosity, at the temperature at which the evaporation takes place, higher than about 100 times that of water of 20 centigrades will increase the pump work so much that the economy will be affected adversely. A viscosity of about 2 poise must be regarded as maximum.

Also another factor which will prevent an economical use of my plant, is in connection with fluids having an osmotic increase of boiling point above a certain limit. As explained in detail my invention attains the utilization of a considerable part of the temperature difference between the condenser side and the recirculation side of the heat exchanger by making it possible to heat the recirculating fluid very little by the passage through the heater tubes. If the recirculating fluid for instance has an osmotic increase of boiling point of 5 centigrades it will be necessary to increase the temperature difference between the compressor and the recirculation side of the heat exchanger at least by 5 centigrades and thereby increasing the energy consumption of the compressor. In practice therefore, an upper limit of about 15 centigrades for the allowable osmotic increase of boiling point must be considered.

Having now specifically and by way of examples explained my invention it will be understood that neither the method nor the plant described is limited to the specific examples given.

In more general terms the method comprises in combination with more specific features the steps of forcibly circulating in the closed circuit the body of fluid, a fraction of which is evaporated and guided off the circuit, whereafter the vapor is compressed and the compressed vapors conducted to the circuit in close proximity to the fluid body for the purpose of condensation and thereby transferring heat to the fluid body.

The more specific features are the control of amount of recirculated fluid body within the limits 300 to 1500 as specified in connection with control of fluid velocity near the condensed vapors so as to enable heat transmission conditions allowing a small effective temperature differential to be used between the condensed vapors and the circulating fluid body together with a small increase of temperature of the fluid body by passing the proximity zone of the condensed vapors.

When talking here about "effective temperature differential" this will be understood as the temperature differential available for the heat transmission between the condensed vapors for the circulating fluid body.

The circumstances which determine the effective temperature differential depend upon the nature of the circulating fluid. If, as stated, for instance this fluid has an osmotic increase of boiling point amounting to $x$ centigrades, the effective temperature differential is that used minus $x$.

Another feature which might influence the effectiveness of the temperature differential selected may be hydrostatic increase of boiling point in the event that it is necessary for some reason to run the plant with a higher hydrostatic head than discussed hereinbefore.

As to the plant, those skilled in the art will easily be able from the teaching given and by means of the examples set forth, to calculate the dimensions to obtain optimum advantages of my invention. The points to be considered are briefly the following:

The tubes in the heat exchanger are chosen so as to obtain a convenient velocity of the fluid body in the tubes. A velocity between 1 and 3 meters per second will as stated be the normal limits, though under certain circumstances these limits may be passed without departing from the scope of the invention. It is understood that the velocity to be chosen corresponds to such heat transmission conditions as make it possible to run the plant with the smallest possible effective temperature differential between the circulation side and the condensation side of the heat exchanger. In case of such predetermined circumstances as osmotic increase of boiling point or the like, the temperature differential chosen must of course be a certain number of degrees larger than the osmotic increase of boiling point. I, therefore prefer here to refer to the temperature differential as the "effective" temperature differential.

From the temperature differential chosen the compressor and its compression ratio is hereby given corresponding to the temperature differential. Due to the small temperature differential the compression ratio is also small, which means that the energy consumption is small.

The recirculating ratio is then chosen in combination with these other specific dimensions within the limits specified so as to give preferably the optimal effect. This means that the circulation ratio is chosen to give the maximum of heat transmission and thereby the maximum amount of fluid evaporated per time unit with the smallest possible increase of temperature of the fluid by the passage in the heat exchanger.

The conditions of course have to be so adapted to the other conditions that the pump work must not be increased so much that the advantageous effect is offset.

The examples given in detail will serve as a guide for the designer and the curve shown in Fig. 4 in connection with the discussion of the curve will make it possible to choose the circulation ratio in such relative proportions to the dimensions of the heat exchanger and the velocity of fluid therein that the optimal effect is obtained.

As a guide it can be indicated that in most cases the effective temperature differential, dependent upon the fluid to be evaporated, should be between about 3 and 12 centigrades corresponding to a compression ratio between about 1.1 and 2.2 and that the allowable increase of temperature by the passage of the heat exchanger should be below 2 centigrades.

The evaporation heat of the water being 540 kcal.$\times$kg.$^{-1}$, and the specific heat being 1.0 kcal.$\times$kg.$^{-1}\times$°C.$^{-1}$ gives a heating of the water amounting to "$t$" °C. at a recirculation ratio "$f$"; "$t$" as a function of "$f$" will then be: The temperature $$t = \frac{540}{1.0 \times f} \frac{\text{kcal.} \times \text{kg.}^{-1}}{\text{kcal.} \times \text{kg.}^{-1} \times \text{°C.}^{-1} \times \text{kg.} \times \text{kg.}^{-1}}$$

$$t = \frac{540}{f} \text{°C.}$$

The derivative $$\frac{dt}{df} = -\frac{540}{f^2}$$

A tangent applied to the outside of the curve forming an angle of 135° with the abscise axis has, with the scale used where $f=200$ is the same length as $t=1$, the slope $-1:200$ (see Fig. 6, where the tangent is shown in broken lines). One will then get:

$$-\frac{540}{-f^2} = -\frac{1}{200}$$

$$f^2 = 108.000$$

$$f = 328.6$$

$$t = 328.6 : 200 = 1.64°$$

These limits will in most cases in combination with the limits of circulation ratio indicated serve all practical purposes, though it will be understood that in some special cases with specific fluids the limits can be passed without departing from the scope of the invention.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described the invention, what I claim as new and desire to be secured by Letters Patent, is as follows:

1. In a method for evaporating fluids having a viscosity not exceeding 2 poise at the evaporation temperature and having an osmotic increase of boiling point not exceeding 15 centigrades: the steps of forcibly circulating a fluid body continuously, removing vapors from said fluid body at a point of the circulation, compressing said vapors removed and allowing said compressed vapors to be condensed at a point adjacent the circulating fluid body, thereby transferring their heat to said fluid body, in combination with such rate of circulation that the weight of the fluid body circulated per time unit is between 300 and 1500 times the weight of the vapors removed from said fluid body in the same time unit and a compression of said vapors removed at a ratio between 1.1 and 2.2, the temperature rise of said fluid body in each cycle being determined by a portion of a curve in which the temperature "$t$" is plotted in centigrades over a quotient "$f$" of the amount of recirculated fluid body divided by the amount of evaporated fluid and the linear distance of each degree "$t$" being equivalent to each two-hundred "f," said portion of said curve being characterized by the derivative $$\frac{dt}{df}$$

pertaining to an angle larger than 135°.

2. In a method for evaporating fluids having a viscosity not exceeding 2 poise at the evaporation temperature and an osmotic increase of boiling point not exceeding 15 centigrades: the steps of forcibly circulating a fluid body continuously, removing vapors from said fluid body at a point of the circulation, compressing and superheating said vapors removed, cooling said superheated vapors to a point near the saturation temperature without condensing them, and then allowing said cooled saturated vapors to be condensed at a point adjacent the circulating fluid body so as to transfer their heat to said fluid body, in combination with such a rate of circulation that the weight of the fluid body circulated per time unit is between 300 and 1500 times the weight of the vapors removed from said fluid body in the same time unit and a compression ratio of said vapors removed between 1.1 and 2.2, the temperature rise of said fluid body in each cycle being determined by a portion of a curve in which the temperature "t" is plotted in centigrades over a quotient "f" of the amount of recirculated fluid body divided by the amount of evaporated fluid and the linear distance of each degree "t" being equivalent to each two-hundred "f," said portion of said curve being characterized by the derivative $$\frac{dt}{df}$$

pertaining to an angle larger than 135°.

3. In a method for distilling water comprising the steps of forcibly circulating an aqueous fluid body continuously, removing water vapors from said circulating body at a point of the circulation, compressing said water vapors removed and allowing said compressed vapors to be condensed at a point adjacent the circulating body to transfer its heat to said body, in combination with a treatment of the circulating body for precipitation of impurities in the form of a slurry and such a rate of recirculation that the weight of the body circulated per time unit is between 300 and 1200 times the weight of the vapors removed from said body in the same time unit, and compressing said water vapors removed at a compression ratio between 1.1 and 1.4, the fluid body being heated less than 2° C. in each cycle.

4. In a method for distilling water comprising the steps of forcibly circulating an aqueous fluid body continuously, removing water vapors from said circulating body at a point of the circulation, compressing said water vapors removed and allowing said compressed vapors to be condensed at a point adjacent the circulating body to transfer its heat to said fluid body, in combination with subjecting the circulating body to electrolysis and such a ratio of recirculation that the weight of the body circulated per time unit is between 300 and 1200 times the weight of the vapors removed from said body in the same time unit, and compressing said water vapors removed at a compression ratio between 1.1 and 1.4, the fluid body being heated less than 2° C. in each cycle.

5. In a method for evaporating fluids having a viscosity not exceeding two poise at the evaporation temperature and an osmotic increase of boiling point not exceeding 15 centigrades: the steps of forcibly circulating continuously a body of the fluid to be evaporated, removing vapors from said fluid body at a point of the circulation, compressing said vapors removed and allowing said compressed vapors to be condensed at a zone adjacent said circulating fluid body thereby transferring their heat to said fluid body maintaining in said zone such a velocity of said circulating fluid body which will correspond to a coefficient of heat transfer between said condensed vapors and said circulating fluid body in said zone enabling use of effective temperature differential in said zone between said condensed vapors and said circulating fluid body of maximum 12 centigrades, adjusting the compression ratio by compressing said vapors to correspond to said temperature differential and circulating per time unit a weight of said fluid body between 300 and 1500 times the weight of the vapors removed from said fluid body in the same time unit, so as to utilize as much as possible of said temperature differential available, the temperature rise of said fluid body in each cycle being determined by a portion of a curve in which the temperature "t" is plotted in centigrades over a quotient "f" of the amount of recirculated fluid body divided by the amount of evaporated fluid and the linear distance of each degree "t" being equivalent to each two-hundred "f," said portion of said curve being characterized by the derivative $$\frac{dt}{df}$$

pertaining to an angle larger than 135°.

6. In a plant for distilling water, a circulating system for a body of aqueous fluid to be distilled comprising a multi-tube type heat exchanger having a circulation portion for the aqueous fluid body and a vapor condensation portion, an evaporator having a fluid inlet, a fluid outlet and a vapor outlet in series with said fluid body circulation portion of said heat exchanger, a conduit for continuously supplying aqueous fluid to said circulating system, a vapor system comprising a compressor having a compression ratio between 1.1 and 1.4, a conduit from said vapor outlet of said evaporator to said compressor to remove vapors from said evaporator, a conduit from said compressor to the vapor condensation portion of said heat exchanger to deliver compressed vapors thereto to transfer heat to said body in combination with a circulation pump dimensioned to circulate in said circulating system a fluid body, the weight of which is between 300 and 1500 times the weight of vapors removed from said evaporator per time unit, a conduit for continuously removing condensed water from the vapor condensation portion of said heat exchanger, electrode means in said circulating system for said fluid body electrically insulated therefrom and means to apply a positive direct current voltage to said electrode means and a negative direct current voltage to said water circulating system, the heat exchanger being so dimensioned that the temperature rise of said fluid body being less than 2° C. in each cycle.

7. In a plant for distilling water, a circulating system for a body of aqueous fluid to be distilled comprising a multi-tube type heat exchanger having a circulation portion for said body and a vapor condensation portion, an evaporator having a fluid inlet, a fluid outlet and a vapor outlet in series with said fluid body circulation portion of said heat exchanger, a conduit for continuously supplying aqueous fluid to said circulating system, a vapor system comprising a compressor having a compression ratio between 1:1 and 1.4, a conduit from said vapor outlet of said evaporator to said compressor to remove vapors from said evaporator, a conduit from said compressor to the vapor condension portion of said heat exchanger to deliver compressed vapors thereto to transfer heat to said body in combination with a circulation pump dimensioned to circulate in said circulating system a fluid body, the weight of which is between 400 and 1100 times the weight of vapors removed from said evaporator per time unit, a conduit for continuously removing condensed water from the vapor condension portion of said heat exchanger, electrode means in said body circulating system electrically insulated therefrom and means to apply a positive direct current voltage to said electrode means and a negative direct current voltage to said body circulating system, an outlet passage from said body circulating system and means for draining off a portion of said circulating body through said passage, the heat exchanger being so dimensioned that the temperature rise of said fluid body being less than 2° C. in each cycle.

8. In a plant for evaporating liquids, a circulating system for a fluid body of the liquid to be evaporated comprising an evaporator and a multi-tube type heat exchanger having a fluid circulation portion in series with said evaporator in said circulating system, means for continuously supplying raw fluid to said circulating system, means for continuously removing concentrated fluid from said circulating system, a vapor system comprising a compressor having a compression ratio between 1.1 and 2.2, said compressor being arranged to remove vapors from said evaporator and to deliver compressed vapors to a condension portion of said heat exchanger in combination with a circulation pump dimensioned to circulate in said circulating system a fluid body, the weight of which per time unit is between 300 and 1500 times the weight of vapors removed from said evaporator per time unit, the heat exchanger being so dimensioned that the temperature rise of said fluid body in each cycle being determined by a portion of a curve in which the temperature "$t$" is plotted in centigrades over a quotient "$f$" of the amount of recirculated fluid body divided by the amount of evaporated fluid and the linear distance of each degree "$t$" being equivalent to each two-hundred "$f$," said portion of said curve being characterized by the derivative $$\frac{dt}{df}$$

pertaining to an angle larger than 135°.

9. In a plant for evaporating liquids, a circulating system for a fluid body of the liquid to be evaporated comprising a heat exchanger and an evaporator in series herewith, means for continuously supplying fluid to said circulating system, a vapor system comprising a compressor having a compression ratio between 1.1 and 2.2, said compressor being arranged to remove vapors from the vapor outlet of said evaporator and to deliver compressed vapors to said heat exchanger in combination with a circulation pump dimensioned to circulate in said circulating system a fluid body, the weight of which is between 300 and 1500 times the weight of vapors removed from said evaporator per time unit, and a heat insulation of said plant, the heat exchanger being so dimensioned that the temperature rise of said fluid body in each cycle being determined by a portion of a curve in which the temperature "$t$" is plotted in centigrades over a quotient "$f$" of the amount of recirculated fluid body divided by the amount of evaporated fluid and the linear distance of each degree "$t$" being equivalent to each two-hundred "$f$," said portion of said curve being characterized by the derivative $$\frac{dt}{df}$$

pertaining to an angle larger than 135°.

10. In a plant for evaporating liquids, a circulating system for a fluid body of the liquid to be evaporated comprising an evaporator and a multi-tube type heat exchanger having a fluid portion and a vapor condension portion arranged with said fluid portion in series with said evaporator, means for continuously supplying raw fluid to said circulating system, means for continuously removing concentrated fluid from said circulating system, a vapor system comprising a compressor having a compression ratio between 1.1 and 2.2, a pipe from said compressor to remove vapors from said evaporator, a pipe from said compressor to deliver compressed vapors to the condension portion of said heat exchanger in combination with a circulation pump dimensioned to circulate in said circulating system a fluid body, the weight of which per time unit is between 300 and 1500 times the weight of vapors removed from said evaporator per time unit, a condensate removing system connected with the condenser portion of said heat exchanger and comprising a condenser receiver in series with a condenser pump, a shunt from said condensate removing system to said delivery pipe from said compressor and spray means at the end of said shunt extending into said pipe line, the heat exchanger being so dimensioned that the temperature rise of said fluid body in each cycle being determined by a portion of a curve in which the temperature "$t$" is plotted in centigrades over a quotient "$f$" of the amount of recirculated fluid body divided by the amount of evaporated fluid and the linear distance of each degree "$t$" being equivalent to each two-hundred "$f$," said portion of said curve being characterized by the derivative $$\frac{dt}{df}$$

pertaining to an angle larger than 135°.

11. In a plant for evaporating fluids comprising an evaporator and a heat exchanger included in series in a closed circuit for a body of fluid to be circulated therein continuously, means for removing vapors evaporated from said fluid body and conducting said vapors from said evaporator, means for compressing said vapors to be condensed in said heat exchanger for heating the fluid body circulating therethrough in combination with means for forcibly circulating said fluid body to an amount by weight per time unit between 300 and 1500 times the amount by weight of vapors removed from said fluid body in the same time unit, said compressor means being designed to compress said vapors at a ratio between 1.1 and 2.2, and said heat exchanger being designed for a velocity therein of said circulating fluid body between 1.5 and 3 m. per second, the heat exchanger being so dimensioned that the temperature rise of said fluid body in each cycle being determined by a portion of a curve in which the temperature "$t$" is plotted in centigrades over a quotient "$f$" of the amount of recirculated fluid body divided by the amount of evaporated fluid and the linear distance of each degree "$t$" being equivalent to each two-hundred "$f$," said portion of said curve being characterized by the derivative $$\frac{dt}{df}$$

pertaining to an angle larger than 135°.

12. In a plant for continuously evaporating fluid, a closed circuit comprising an evaporator and a heat exchanger in series, means for forcibly circulating in said closed circuit a body of said fluid, a compressor, means for guiding vapors formed in said evaporator off said closed circuit to said compressor and compressing said vapors therein, means for conducting compressed vapors to said heat exchanger in proximity to the fluid body circulating therethrough in said closed circulating circuit for heating the latter for a predetermined temperature differential and condensation of the vapors, in combination with the fluid circulation portion of the heat exchanger being so dimensioned that the velocity of the circulating fluid therein will provide heat transmission conditions enabling an effective temperature differential not exceeding 12 centigrades to be used between the condensed vapors and the circulating fluid in the heat exchanger compressing said vapors by means of said compressor corresponding to said temperature differential and such a magnitude of said forcibly circulating means that the fluid body circulated per time unit by weight is between 300 and 1500 times the weight of vapors guided off said circuit per same time unit corresponding to an increase of temperature of said fluid body by the passage of said heat exchanger not exceeding 2 centigrades.

13. In a plant for continuously evaporating fluid, a closed circuit comprising an evaporator and a heat exchanger in series, means for forcibly circulating in said closed circuit a body of said fluid, a compressor, means for guiding vapors formed in said evaporator off said closed circuit to said compressor and compressing said vapors therein, means for conducting compressed vapors to said heat exchanger in proximity to the fluid body circulating therethrough in said closed circulating circuit for condensation of the vapors and heating the fluid body, in combination with the fluid circulation portion of said heat exchanger being so dimensioned that the velocity of the circulating fluid therein will provide heat transmission conditions enabling a small effective temperature differential to be used between the condensed vapors and the circulating fluid in the heat exchanger compressing said vapors guided off said circuit to an amount corresponding to said small temperature differential and such a magnitude of said forcibly circulating means that the fluid body circulated per time unit by weight is between 300 and 1500 times the weight of the vapors guided off said circuit per same time unit corresponding to a small increase of temperature of said fluid body by the passage of said heat exchanger, the heat exchanger being so dimensioned that the temperature rise of said fluid body in each cycle being determined by a portion of a curve in which the temperature "$t$" is plotted in centigrades over a quotient "$f$" of the amount of recirculated fluid body divided by the amount of evaporated fluid and the linear distance of each degree "$t$" being equivalent to each two-hundred "$f$," said portion of said curve being characterized by the derivative $$\frac{dt}{df}$$

pertaining to an angle larger than 135°.

14. In a plant for evaporating fluids comprising an evaporator and a heat exchanger included in series in a closed circuit for a body of fluid to be circulated therein continuously, means for removing vapors evaporated from said fluid body and conducting said vapors from said evaporator, means for compressing said vapors removed, and means for conducting said compressed vapors to be condensed in said heat exchanger for heating the fluid body circulating therethrough in combination with means for forcibly circulating said fluid body to an amount by weight per time unit between 300 and 1500 times the amount by weight of vapors removed from said fluid body in the same time unit and with such a velocity through said heat exchanger so as to provide heat transmission conditions enabling said compressor means to compress said vapors removed at a compression ratio between 1.1 and 2.2 corresponding to an effective temperature differential of between 3 and 12 centigrades in said heat exchanger between said compressed vapors and said circulating fluid body, the heat exchanger being so dimensioned that the temperature rise of said fluid body in each cycle being determined by a portion of a curve in which the temperature "$t$" is plotted in centigrades over a quotient "$f$" of the amount of recirculated fluid body divided by the amount of evaporated fluid and the linear distance of each degree "$t$" being equivalent to each two-hundred "$f$," said portion of said curve being characterized by the derivative $$\frac{dt}{df}$$

pertaining to an angle larger than 135°.

15. In a plant for continuously evaporating a fluid having an osmotic increase of boiling temperature, a closed circuit comprising an evaporator and a heat exchanger in series, means for forcibly circulating in said closed circuit a body of said fluid, a compressor, means for guiding vapors formed in said evaporator off said closed circuit to said compressor and compressing said vapors therein, means for conducting compressed vapors to said heat exchanger in proximity to the fluid body circulating therethrough in said closed circulating circuit for condensation of the vapors and heating said fluid body, in combination with a magnitude of said forcibly circulating means that the fluid body circulated per time unit by weight is between 300 and 1500 times the weight of vapors guided off said circuit per same time unit and the fluid circulation portion of said heat exchanger being so dimensioned that the velocity of the circulating fluid therein will provide heat transmission conditions enabling an effective temperature differential not exceeding the osmotic increase of boiling temperature by more than 12 centigrades to be used between the condensed vapors and the circulating fluid in the heat exchanger compressing said vapors by means of said compressor corresponding to said temperature differential and such a magnitude of said forcibly circulating means that the fluid body circulated per time unit by weight is between 300 and 1500 times the weight of vapors guided off said circuit per same time unit corresponding to an increase of temperature of said fluid body by the passage of said heat exchanger not exceeding 2 centigrades.

16. In a plant for continuously evaporating a fluid, means for forcibly circulating continuously a body of said fluid, means for removing vapors from said fluid body at a point of the circulation, compressor means for compressing said vapors removed, means for guiding said compressed vapors to be condensed in a zone adjacent said circulating fluid body thereby transferring their heat to said fluid body, means for maintaining in said zone a velocity of said circulating fluid body corresponding to a coefficient of heat transfer between said condensed vapors and said circulating fluid body enabling use of an effective temperature differential between said condensed vapors and said circulating fluid body in said zone not exceeding 12 centigrades, the compression ratio of said compressor means being so dimensioned to correspond to said temperature differential, and said means for forcibly circulating said fluid body being designed to circulate per time unit a weight of said fluid body between 300 and 1500 times the weight of vapors removed from said fluid body in the same time unit, the heat exchanger being so dimensioned that the temperature rise of said fluid body in each cycle being determined by a portion of a curve in which the temperature "$t$" is plotted in centigrades over a quotient "$f$" of the amount of recirculated fluid body divided by the amount of evaporated fluid and the linear distance of each degree "$t$" being equivalent to each two-hundred "$f$," said portion of said curve being characterized by the derivative $$\frac{dt}{df}$$

pertaining to an angle larger than 135°.

ROLF ANDERSEN.

REFERENCES CITED

The following references are of record in the file of this patent:

UNITED STATES PATENTS

| Number | Name | Date |
| --- | --- | --- |
| 849,579 | Siebel | Apr. 9, 1907 |
| 1,213,596 | De Bufre | Jan. 23, 1917 |
| 1,547,984 | Weber | July 28, 1925 |
| 1,699,974 | Kirkaldy | Jan. 22, 1929 |
| 1,843,673 | Hessenbruch | Feb. 2, 1932 |
| 1,862,663 | Curtis | June 14, 1932 |
| 1,984,689 | Nagy et al. | Dec. 18, 1934 |
| 2,290,373 | Lee | July 21, 1942 |
| 2,324,663 | Aiton | July 20, 1943 |
| 2,441,361 | Kirgan | May 11, 1948 |
| 2,449,587 | Chambers | Sept. 21, 1948 |

FOREIGN PATENTS

| Number | Country | Date |
| --- | --- | --- |
| 208,503 | Great Britain | May 1, 1924 |
| 353,346 | Great Britain | July 23, 1931 |
| 580,928 | Germany | July 19, 1933 |

OTHER REFERENCES

Badger and McCabe, "Elements of Chemical Engineering," Second Edition, McGraw-Hill (1936), pgs. 126–137.

Latham, "Compression Distillation," Petroleum Refiner, vol. 24, No. 12 (1945), pages (512 to 518).